United States Patent
Wu et al.

(10) Patent No.: US 10,572,766 B2
(45) Date of Patent: Feb. 25, 2020

(54) IMAGE COLLATION DEVICE, IMAGE COLLATION METHOD, AND PROGRAM

(71) Applicant: NIPPON TELEGRAPH AND TELEPHONE CORPORATION, Tokyo (JP)

(72) Inventors: Xiaomeng Wu, Atsugi (JP); Kunio Kashino, Atsugi (JP)

(73) Assignee: NIPPON TELEGRAPH AND TELEPHONE CORPORATION, Tokyo (JP)

(*) Notice: Subject to any disclaimer, the term of this patent is extended or adjusted under 35 U.S.C. 154(b) by 103 days.

(21) Appl. No.: 15/741,694

(22) PCT Filed: Jul. 1, 2016

(86) PCT No.: PCT/JP2016/069609
§ 371 (c)(1),
(2) Date: Jan. 3, 2018

(87) PCT Pub. No.: WO2017/006852
PCT Pub. Date: Jan. 12, 2017

(65) Prior Publication Data
US 2018/0197044 A1    Jul. 12, 2018

(30) Foreign Application Priority Data
Jul. 6, 2015    (JP) .................................. 2015-135297

(51) Int. Cl.
*G06K 9/62* (2006.01)
*G06K 9/46* (2006.01)

(52) U.S. Cl.
CPC .......... *G06K 9/6211* (2013.01); *G06K 9/4638* (2013.01); *G06K 9/6215* (2013.01); *G06K 9/6232* (2013.01)

(58) Field of Classification Search
CPC ........................ G06K 9/6211; G06K 9/4638
See application file for complete search history.

(56) References Cited

U.S. PATENT DOCUMENTS

| 9,245,201 B1* | 1/2016 | Jin | ........................ | G06K 9/6202 |
| 2004/0037451 A1* | 2/2004 | Kim | ..................... | G06K 9/6206 |
| | | | | 382/113 |

(Continued)

FOREIGN PATENT DOCUMENTS

| JP | 2004-326693 A | 11/2004 |
| JP | 2015-114819 A | 6/2015 |
| WO | WO-2015/099016 A1 | 7/2015 |

OTHER PUBLICATIONS

Herve Jegou et al: "Hamming Embedding and Weak Geometric Consistency for Large Scale Image Search" In: "Serious Games", Jan. 1, 2008, vol. 5302, pp. 304-317, Springer International Publishing, Cham.

(Continued)

*Primary Examiner* — Santiago Garcia
(74) *Attorney, Agent, or Firm* — Harness, Dickey & Pierce, P.L.C.

(57) ABSTRACT

An image collation device includes: a tentative matching point extraction unit configured to extract a plurality of tentative matching points that are pairs of corresponding feature points between a pair of input images; and a spatial verification unit configured to evaluate a degree of similarity between the pair of input images on the basis of all of a limiting conditions regarding consistency of a scale factor, a limiting conditions regarding consistency of a rotational angle, and a limiting conditions regarding consistency of a relative positional relationship according to a comparison of or a difference between geometric transformation parameters of the tentative matching points for each of the pairs of tentative matching points that is a combination of the tentative matching points extracted by the tentative matching point extraction unit.

15 Claims, 5 Drawing Sheets

(56) References Cited

U.S. PATENT DOCUMENTS

| | | | |
|---|---|---|---|
| 2005/0213818 A1 | 9/2005 | Suzuki et al. | |
| 2010/0310182 A1* | 12/2010 | Kroepfl | G06K 9/00624 382/216 |
| 2013/0121598 A1* | 5/2013 | Xin | G06K 9/6211 382/201 |
| 2013/0315490 A1* | 11/2013 | Akiyama | G06K 9/46 382/201 |
| 2014/0044362 A1* | 2/2014 | Mavromatis | G06K 9/6202 382/201 |
| 2014/0211989 A1* | 7/2014 | Ding | G06K 9/6211 382/103 |
| 2015/0131897 A1* | 5/2015 | Tsao | G06K 9/00718 382/154 |
| 2015/0169993 A1* | 6/2015 | Rabinovich | G06F 16/51 382/224 |
| 2017/0249516 A1* | 8/2017 | Lepsoy | G06K 9/00758 |

OTHER PUBLICATIONS

D Omercevic et al: "High-Dimensional Feature Matching: Employing the Concept of Meaningful Nearest Neighbors", 2013 IEEE International Conference on Computer Vision, Oct. 1, 2007, pp. 1-8.
European Search Report 16821321.3 for PCT/JP2016069609 dated Jan. 4, 2019.
Japanese Office Action "Notice of Allowance" in related application JP 2017-527421, JPO, dated Nov. 6, 2018, with English translation attached.
Zhen Liu et al., Embedding spatial context information into inverted file for largescale image retrieval. In ACM Multimedia, pp. 199-208, 2012.
Xiaomeng Wu et al., Image retrieval based on anisotropic scaling and shearing invariant geometric coherence. In ICPR. pp. 3951-3956, 2014.
Yannis S. Avrithis et al., Hough pyramid matching: Speeded-up geometry re-ranking for large scale image retrieval. International Journal of Computer Vision, vol. 107, No. 1, pp. 1-19, 2014.
Krystian Mikolajczyk et al., Scale & affine invariant interest point detectors. International Journal of Computer Vision, vol. 60, No. 1, pp. 63-86, 2004.
David G. Lowe. Distinctive image features from scale invariant keypoints. International Journal of Computer Vision, vol. 60, No. 2, pp. 91-110, 2004.
James Philbin et al., Object retrieval with large vocabularies and fast spatial matching. In CVPR, 2007.
Marius Muja et al., Fast approximate nearest neighbors with automatic algorithm configuration. In VISAPP, pp. 331-340, 2009.
International Search Report for PCT/JP2016/069609, ISA/JP, Tokyo, dated Sep. 13, 2016, with English translation attached.

\* cited by examiner

IMAGE COLLATION DEVICE, IMAGE COLLATION METHOD, AND PROGRAM

CROSS REFERENCE TO RELATED APPLICATIONS

This application is a 371 U.S. National Stage of International Application No. PCT/JP2016/069609, filed Jul. 1, 2016. This application claims the benefit of and priority to Japanese Patent Application No. 2015-135297, filed Jul. 6, 2016. The entire disclosures of the above applications are incorporated herein by reference.

TECHNICAL FIELD

The present invention relates to an image collation device, an image collation method, and a program, and particularly, to an image collation device, an image collation method, and a program for obtaining a degree of similarity between images.

Priority is claimed on Japanese Patent Application No. 2015-135297, filed Jul. 6, 2015, the content of which is incorporated herein by reference.

BACKGROUND ART

Image collation according to a local feature amount is a technique of calculating a local feature amount from a large number of feature points extracted from two input images and comparing a feature point of a first image with a feature point of a second image to determine whether or not a degree of similarity of the local feature amount is high. An objective such as same image searching, similar image searching, and image recognition can be realized by image collation. Hereinafter, a pair of a first image and a second image obtained by imaging an object different from an object appearing in the first image is referred to as unrelated images. A pair of a first image and a second image obtained by imaging the same object as an object appearing in the first image is referred to as related images. In the related technology, for two unrelated images, when both of the images include a repetitive pattern such as a checkered pattern, a fine pattern of texture, or the like, there may be a large number of feature points which are incorrectly matched between the images. Accordingly, an unrelated image is often erroneously recognized as a related image.

In order to reduce an influence of this problem, an image collation device that considers the consistency of a spatial relationship, a geometric transformation, or the like has been invented. A spatial relationship is a proximity relationship or a relative positional relationship between feature points. Hereinafter, a pair of feature points having a high degree of similarity for a local feature amount between two images is referred to as tentative matching points. A geometric transformation means linear transformation parameters, a displacement vector, or the like calculated from geometric characteristics of two feature points constituting the tentative matching points. Hereinafter, a tentative matching point satisfying limiting conditions such as a spatial relationship or geometric transformation among the tentative matching points is called a correct matching points.

The image collation devices disclosed in Non-Patent Document 1 and 2 include a process of searching for neighbors in a position coordinate space of a feature point in an input image, a process of calculating a relative position vector from a pair of feature points that are neighbors, a process of quantizing the relative position vector, a process of quantizing a local feature amount of the feature point, a process of creating an inverted index on the basis of a result of the quantization, a process of identifying a pair of correct matching points using the inverted index, and a process of calculating a degree of similarity between images on the basis of a pair of correct matching points. The image collation device disclosed in Non-Patent Document 3 includes a process of calculating geometric transformation parameters indicating scaling, rotation, and displacement from a tentative matching point between input images, a process of quantizing the geometric transformation parameters, a process of creating a voting histogram on the basis of a result of the quantization, and a process of calculating a degree of similarity between images on the basis of the voting histogram.

CITATION LIST

Non-Patent Document

[Non-Patent Document 1]
  Zhen Liu, Houqiang Li, Wengang Zhou, and Qi Tian. Embedding spatial context information into inverted file for large-scale image retrieval. In ACM Multimedia, pp. 199-208, 2012.
[Non-Patent Document 2]
  Xiaomeng Wu and Kunio Kashino. Image Retrieval based on Anisotropic Scaling and Shearing Invariant Geometric Coherence. In ICPR, pp. 3951-3956, 2014.
[Non-Patent Document 3]
  Yannis S. Avrithis and Giorgos Tolias. Hough Pyramid Matching: Speeded-up geometry re-ranking for Large Scale Image Retrieval. International Journal of Computer Vision, Vol. 107, No. 1, pp. 1-19, 2014.

SUMMARY OF INVENTION

Technical Problem

The image collation devices disclosed in Non-Patent Documents 1 and 2 focuses on a pair of feature points in an input image, and identifies a pair of correct matching points using a total of two types of limitation in a spatial relationship "consistency of a proximity relationship" and "consistency of a relative positional relationship". The image collation device disclosed in Non-Patent Document 3 focuses on tentative matching points between the input images, and removes erroneously matched tentative matching points using a total of three types of constraint in geometric transformation "consistency of a scale factor, "consistency of a rotational angle", and "consistency of a displacement vector". Hereinafter, a constraint in a spatial relationship and a constraint in a geometric transformation are collectively referred to as spatial constraints. In the related technology, since the number and type of spatial constraints used for identifying correct matching points are limited, the discrimination ability for erroneously matched tentative matching points often may be insufficient. A method of forcibly increasing the degree of the spatial constraints such as increasing the resolution of the quantization is conceivable, but search omission, excessive removal, or the like of correct matching points may then occur. Increasing the discrimination ability for erroneously matched tentative matching points while avoiding search omission or the like for correct matching points is a first problem to be solved by the present invention.

The above problem can be solved by coupling constraints of a spatial relationship to constraints of a geometric transformation, but it is difficult to combine both in the related technology. For example, the image collation devices disclosed in Non-Patent Documents 1 and 2 calculates a feature amount of the spatial relationship from a pair of feature points in an input image by focusing on the pair of feature points prior to extracting tentative matching points. Since the tentative matching points have not yet been extracted in a step of using this technology, it is not possible to calculate the geometric transformation parameters. Therefore, it is not possible to add constraints of a geometric transformation to this technology. Meanwhile, the image collation device disclosed in Non-Patent Document 3 extracts tentative matching points and then calculates geometric transformation parameters by focusing on tentative matching points between input images. Then, each single tentative matching point is voted in a parameter section corresponding to the geometric transformation parameter to create a vote histogram. This vote can only be performed for each single tentative correspondence point, and calculation of the feature amounts of the spatial relationship requires at least two matching points. Therefore, it is not possible to add constraints of a spatial relationship to this technology.

Since the image collation devices (Non-Patent Documents 1 and 2) using the constraints of a spatial relationship perform feature amount calculation and index creation by targeting pairs of feature points in the input image, the memory usage required for image collation, and a size of a search space (a length of time required for searching) are proportional to the number of pairs of feature points. For example, when there are 1000 images in a database, the memory usage is about 8 GB, and when there are one million images, the memory usage is about 8 TB. Reducing the memory usage and the search space (the time required for searching) without sacrificing the accuracy of searching is a second problem to be solved by the present invention.

The present invention has been made to solve the above problems, and an object of the present invention is to provide an image collation device, method, and program capable of accurately and rapidly collating images even when the number of times of matching of feature points between unrelated images is large and the geometric transformation between related images is large.

Solution to Problem

A first aspect of the present invention is an image collation device including: a tentative matching point extraction unit configured to extract a plurality of tentative matching points that are pairs of corresponding feature points between a pair of input images; and a spatial verification unit configured to evaluate the degree of similarity between the pair of input images on the basis of all limiting condition regarding the consistency of a scale factor, all limiting condition regarding the consistency of a rotational angle, and all limiting condition regarding the consistency of a relative positional relationship according to a comparison of or a difference between geometric transformation parameters of the tentative matching points for each of the pairs of tentative matching points that is a combination of the tentative matching points extracted by the tentative matching point extraction unit.

According to a second aspect of the present invention, the image collation device according to the first aspect further includes a K-neighbor search unit configured to extract pairs of tentative matching points that are neighbors from all pairs of tentative matching points on the basis of the set of feature points of k neighbors of each feature point in the pair of tentative matching points, wherein the spatial verification unit evaluates the degree of similarity between the pair of input images on the basis of all of the limiting conditions for each pair of tentative matching points that are neighbors extracted by the K-neighbor search unit.

According to a third aspect of the present invention, in the image collation device according to the first or second aspect, the limiting condition regarding the consistency of the scale factor is, regarding the feature points at first and second tentative matching points forming the pair of tentative matching points and first and second input images forming the pair of input images, that a scale of the feature point of any one of the first and second tentative matching points is large in both of a relationship between the magnitudes of scales of the feature points in the first input image and a relationship between magnitudes of scales of the feature points in the second input image, or a scale of the feature point of any one of the first aid second input images is large in both of a relationship between magnitudes of scales of the feature points in the first tentative matching point and a relationship between magnitudes of scales of the feature points in the second tentative matching point.

According to a fourth aspect of the present invention, in the image collation device according to any one of the first to third aspects, the limiting condition regarding the consistency of the rotational angle is, regarding the feature points at first and second tentative matching points forming the pair of tentative matching points and first and second input images forming the pair of input images, that an absolute value of a difference between a first rotational angle and a second rotational angle is smaller than a first previously predetermined threshold value, the first rotational angle being a difference between a characteristic angle of the first tentative matching point in the first input image and a characteristic angle of the first tentative matching point in the second input image, the second rotational angle being a difference between a characteristic angle of the second tentative matching point in the first input image and a characteristic angle of the second tentative matching point in the second input image.

According to a fifth aspect of the present invention, in the image collation device according to any one of the first to fourth aspects, the limiting condition regarding the consistency of the relative positional relationship is, regarding the feature points at respective first and second tentative matching points forming the pair of tentative matching points and first and second input images forming the pair of input images, that a maximum value of a length of a difference vector is smaller than a previously predetermined second threshold value, the difference vector being a difference between a first relative position vector and a second relative position vector, the first relative position vector indicating a difference in position between the characteristic point of the first tentative matching point and the characteristic point of the second tentative matching point in the first input image, the second relative position vector indicating a difference in position between the characteristic point of the first tentative matching point and the characteristic point of the second tentative matching point in the second input image, each of radius vectors obtained by converting the first and second relative position vectors into polar coordinates is greater than a previously predetermined third threshold value, and an absolute value of a difference between deflection angles obtained by converting the first and second relative position vectors into polar coordinates is smaller than a previously predetermined fourth threshold value.

According to a sixth aspect of the present invention, in the image collation device according to any one of the first to fifth aspects, the spatial verification unit evaluates the degree of similarity between the pair of input images on the basis of the pair of tentative matching points satisfying all of the limiting condition regarding the consistency of the scale factor, the limiting condition regarding the consistency of the rotational angle, and the limiting condition regarding the consistency of the relative positional relationship.

A seventh aspect of the present invention is an image collation method in an image collation device including a tentative matching point extraction unit and a spatial verification unit, the image collation method including extracting, by the tentative matching point extraction unit, a plurality of tentative matching points that are pairs of corresponding feature points between a pair of input images; and evaluating, by the spatial verification unit, a degree of similarity between the pair of input images on the basis of all of a limiting condition regarding consistency of a scale factor, a limiting condition regarding consistency of a rotational angle, and a limiting condition regarding consistency of a relative positional relationship according to a comparison of or a difference between geometric transformation parameters of the tentative matching points for each of the pairs of tentative matching points that is a combination of the tentative matching points extracted by the tentative matching point extraction unit.

According to an eighth aspect of the present invention, in the image collation method according to the seventh aspect, the image collation device further includes a K-neighbor search unit, and the image collation method includes extracting, by the K-neighbor search unit, the pairs of tentative matching points that are neighbors from all pairs of the tentative matching points on the basis of the set of feature points of k neighbors of each feature point in the pair of tentative matching points; and evaluating, by the spatial verification unit, the degree of similarity between the pair of input images on the basis of all of the limiting conditions for each pair of tentative matching points that are neighbors extracted by the K-neighbor search unit.

According to a ninth aspect of the present invention, in the image collation method of the seventh or eighth aspect, the limiting condition regarding the consistency of the scale factor is, regarding the feature points at first and second tentative matching points forming the pair of tentative matching points and first and second input images forming the pair of input images, that a scale of the feature point of any one of the first and second tentative matching points is large in both of a relationship between magnitudes of scales of the feature points in the first input image and a relationship between magnitudes of scales of the feature points in the second input image, or a scale of the feature point of any one of the first and second input images is large in both of a relationship between magnitudes of scales of the feature points in the first tentative matching point and a relationship between magnitudes of scales of the feature points in the second tentative matching point.

According to a tenth aspect of the present invention, in the image collation method according to any one of the seventh to ninth aspects, the limiting condition regarding the consistency of the rotational angle is, regarding the feature points at first and second tentative matching points forming the pair of tentative matching points and first and second input images forming the pair of input images, that an absolute value of a difference between a first rotational angle and a second rotational angle is smaller than a first previously predetermined threshold value, the first rotational angle being a difference between a characteristic angle of the first tentative matching point in the first input image and a characteristic angle of the first tentative matching point in the second input image, the second rotational angle being a difference between a characteristic angle of the second tentative matching point in the first input image and a characteristic angle of the second tentative matching point in the second input image.

According to an eleventh aspect of the present invention, in the image collation method according to any one of the seventh to tenth aspects, the limiting condition regarding the consistency of the relative positional relationship is, regarding the feature points at respective first and second tentative matching points forming the pair of tentative matching points and first and second input images forming the pair of input images, that a maximum value of a length of a difference vector is smaller than a previously predetermined second threshold value, the difference vector being a difference between a first relative position vector and a second relative position vector, the first relative position vector indicating a difference in position between the characteristic point of the first tentative matching point and the characteristic point of the second tentative matching point in the first input image, the second relative position vector indicating a difference in position between the characteristic point of the first tentative matching point and the characteristic point of the second tentative matching point in the second input image, each of radius vectors obtained by converting the first and second relative position vectors into polar coordinates is greater than a previously predetermined third threshold value, and an absolute value of a difference between deflection angles obtained by converting the first and second relative position vectors into polar coordinates is smaller than a previously predetermined fourth threshold value.

According to a twelfth aspect of the present invention, in the image collation method according to any one of the seventh to eleventh aspects, the spatial verification unit evaluates the degree of similarity between the pair of input images on the basis of the pair of tentative matching points satisfying all of the limiting condition regarding the consistency of the scale factor, the limiting condition regarding the consistency of the rotational angle, and the limiting condition regarding the consistency of the relative positional relationship.

A program according to the present invention is a program for causing a computer to function as each unit constituting the image collation device according to any one of the first to sixth aspects.

Advantageous Effects of Invention

According to the image collation device, the image collation method, and the program of the present invention, an effect that it is possible to accurately and rapidly collate images can be obtained even when the number of times of matching of feature points between unrelated images is large and the geometric transformation between related images is large, by determining whether or not each of the pairs of tentative matching points satisfies all of the limiting condition regarding the consistency of the scale factor, the limiting condition regarding the consistency of the rotational angle, and the limiting condition regarding the consistency of the relative positional relationship according to the comparison of or the difference between the geometric transformation parameters of the tentative matching points, and outputting the number of pairs of tentative matching points determined to satisfy all the limiting conditions as the degree of similarity between pairs of input images.

DESCRIPTION OF EMBODIMENTS

Figure 1:
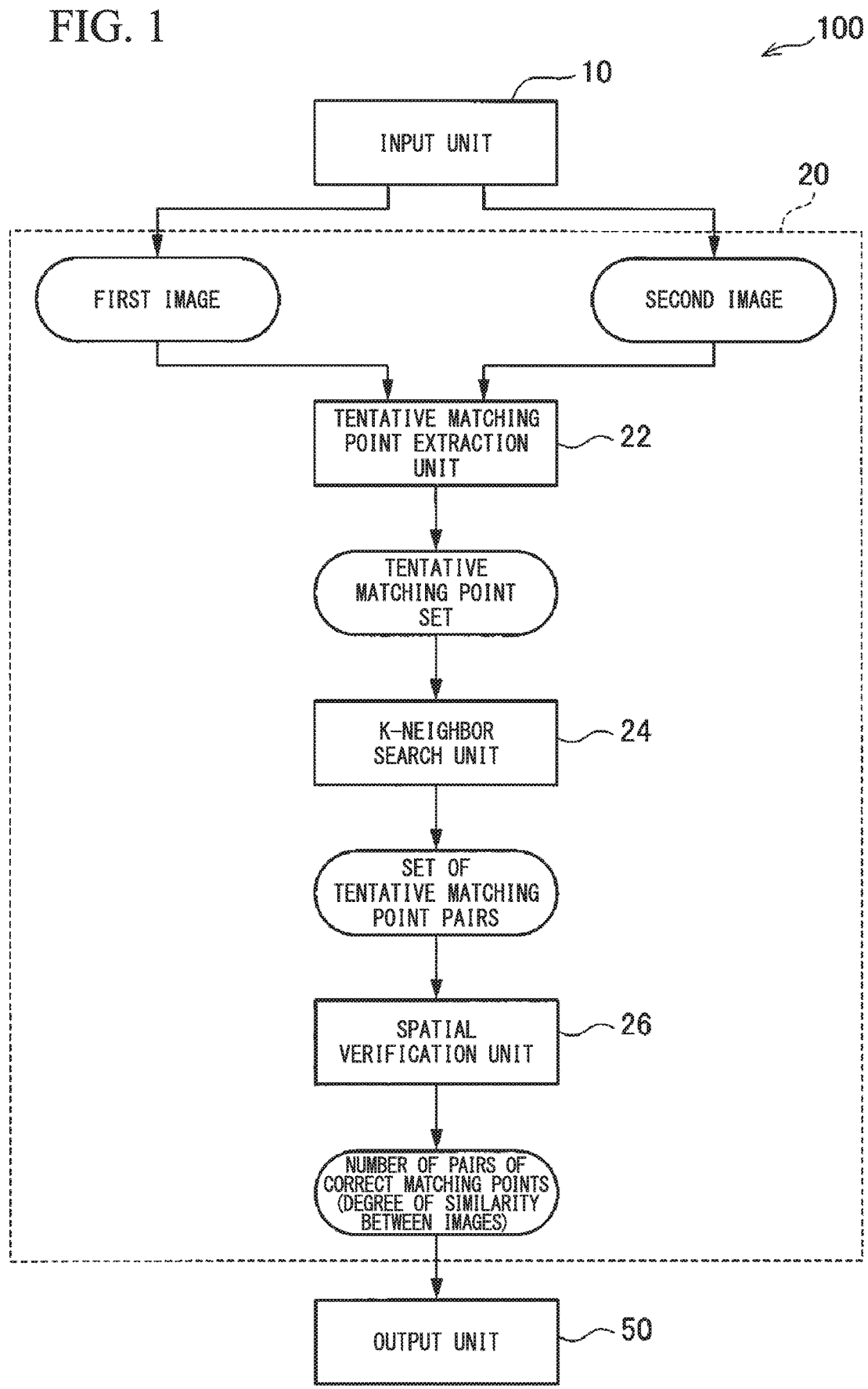
FIG. 1 is a block diagram showing a configuration of an image collation device according to an embodiment of the present invention.

Hereinafter, embodiments of the present invention will be described in detail with reference to the drawings.
<Overview of Embodiment of Present Invention>

Using a "similarity between local feature amounts", tentative matching points are first extracted from feature points of the input images. Then, by focusing on pairs of tentative matching points, the pairs of tentative matching points between images satisfying all limiting conditions including a total of three types of space constraint "consistency of a scale factor", "consistency of a rotational angle", and "consistency of a relative positional relationship" are determined as pairs of correct matching points. Further, in order to use a constraint in a geometric transformation, the limiting conditions are designed on the basis of a difference or comparison between geometric transformation parameters by focusing on pairs of tentative matching points, instead of vising a voting process (Hough transformation) dependent on each single tentative matching point. Thus, by first extracting the tentative matching points and then focusing on the pairs of tentative matching points, it is possible to combine the constraint in a spatial relationship and the constraint in a geometric transformation. By coupling the constraint in the spatial relationship to the constraint in a geometric transformation to increase the number and type of spatial constraints, the first problem is solved.

Further, pairs of tentative matching points that are neighbors are searched for using k feature points closest in a position coordinate space from the feature points with respect to the tentative matching points between the input images. When it is verified whether or not the tentative matching points satisfy a condition of a spatial constraint, by not targeting all the pairs of tentative matching points, but targeting only the pairs of tentative matching points that are neighbors, a pair of tentative matching points that satisfies the limiting condition is determined to be a pair of correct matching points using the space constraint. The tentative matching points are first identified on the basis of "similarity between local feature amounts" and then it is verified whether or not the pair of tentative matching points satisfies the condition of the spatial constraint by targeting the pairs of tentative matching points, instead of targeting the pairs of feature points as in the image collation device disclosed in Non-Patent Documents 1 and 2 above.

Further, when the tentative matching points are extracted, it is sufficient to incorporate data of the feature points into the inverted index, and it is not necessary to incorporate the data of the pairs of feature points into the index. Since the number of feature points is much smaller than that of pairs of feature points, the memory usage required at the time of image collation is lower. Meanwhile, the number of times of verification of the condition of the spatial constraint is reduced to a low number, the search space is made small, and the time required for searching is shortened by not targeting all pairs of tentative matching points, but targeting only pairs of tentative matching points that are neighbors in the position coordinate space, thereby solving the above second problem.
<Configuration of Image Collation Device According to Embodiment of Present Invention>

Next, a configuration of the image collation device according to the embodiment of the present invention will be described. As shown in FIG. 1, the image collation device 100 according to the embodiment of the present invention can be configured as a computer including a CPU, a RAM, and a ROM that stores a program for executing an image collation processing routine to be described below and various types of data. As shown in FIG. 1, the image collation device 100 functionally includes an input unit 10, a calculation unit 20, and an output unit 50.

The calculation unit 20 includes a tentative matching point extraction unit 22 that extracts tentative matching points from a pair of input images, a K-neighbor search unit 24 that searches for a pair of tentative matching points that are neighbors using k neighbors of the feature points in the position coordinate space with respect to the tentative matching points, and a spatial verification unit 26 that identifies a pair of correct matching points from the pairs of tentative matching points which are neighbors. The image collation device 100 according to the embodiment of the present invention receives two input images and outputs the number of pairs of correct matching points as the degree of similarity between the images.
<Tentative Corresponding Point Extraction Unit>

Figure 2:
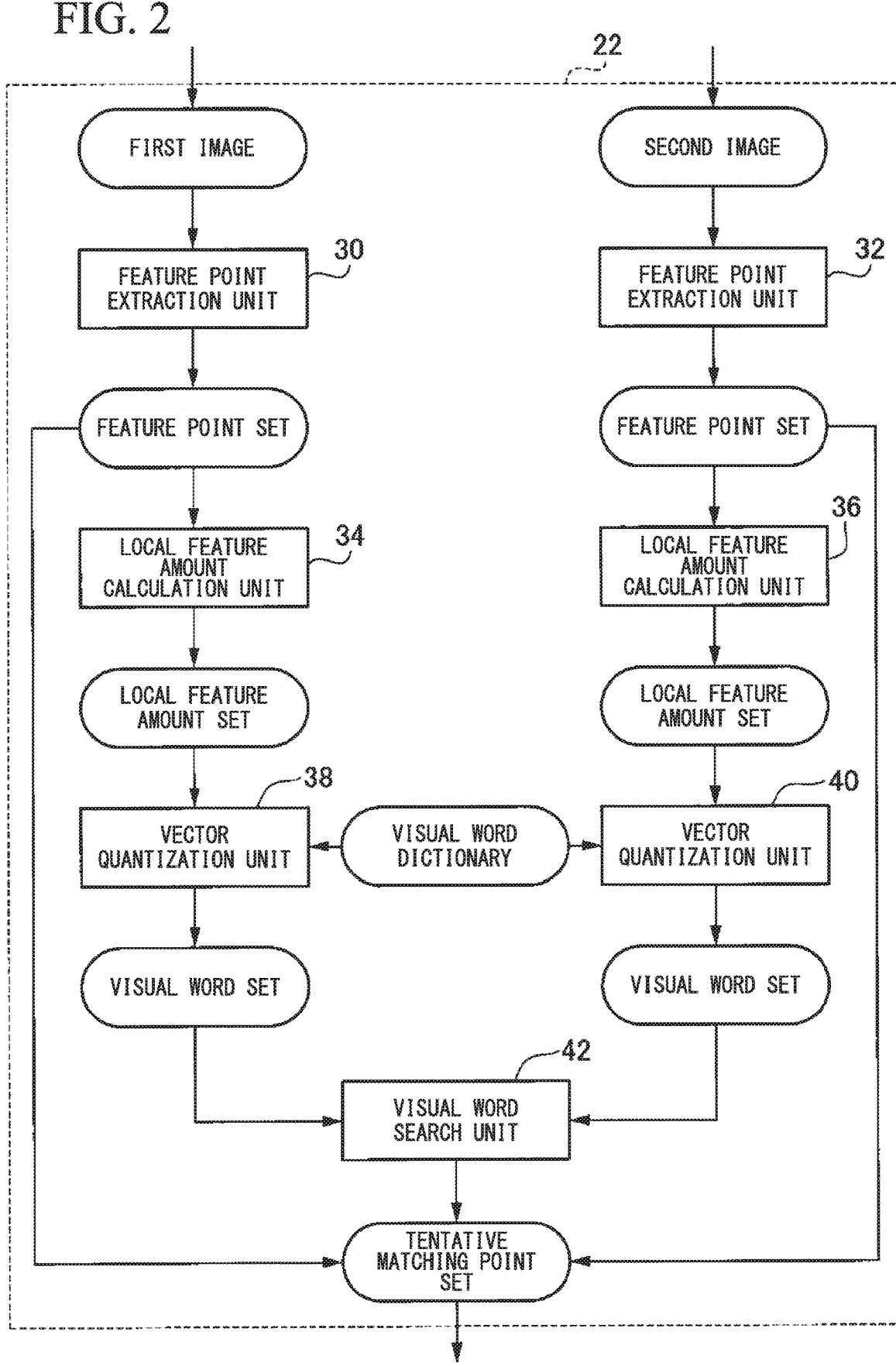
FIG. 2 is a block diagram showing a configuration of a tentative matching point extraction unit of the image collation device according to the embodiment of the present invention.

FIG. 2 is a block diagram showing an example of a configuration of the tentative matching point extraction unit 22. The tentative matching point extraction unit 22 includes feature point extraction units 30 and 32 that extract feature points from input images and calculate a set of feature points, local feature amount calculation units 34 and 36 that calculate a set of local feature amounts from the set of feature points, vector quantization units 38 and 40 that quantize the set of local feature amounts into a set of visual words on the basis of a previously prepared visual word dictionary, and a visual word search unit 42 that searches for pairs of feature points designated by the same visual word among the set of visual words obtained from the two input images, as a set of tentative matching points. The tentative matching point extraction unit 22 receives the two input images and the previously prepared visual word dictionary and outputs a set of tentative matching points.

The feature point extraction unit 30 extracts feature points from the first image in the pair of input images and outputs a set of feature points. In this embodiment, a Hessian Affine Region Detector disclosed in Non-Patent Document 4 is used.

[Non-Patent Document 4]: Krystian Mikolajczyk and Cordelia Schmid. Scale & affine invariant interest point detectors, international Journal of Computer Vision, Vol. 60, No. 1, pp. 63-86, 2004.

Specifically, the feature point extraction unit 30 receives the first image in the pair of input Images and outputs a set of feature points. Each feature point is represented as a scale, a characteristic angle, and two-dimensional position coordinates. In this embodiment, in each feature point $p \in P$ in the set P of feature points extracted from the input image, the scale is represented by $\sigma(p)$, the characteristic angle is $\theta(p)$, and the two-dimensional position coordinates are represented by $t(p)=[x(p)\ y(p)]^T$.

The feature point extraction unit 32 receives the second image in the pair of input images, extracts the feature points, and outputs a set of feature points, similar to the feature point extraction unit 30.

The local feature amount calculation unit 34 receives the set of feature points output from the feature point extraction unit 30, calculates a local feature amount from each feature point included in the set of feature points, and outputs a set of local feature amounts. In this embodiment, the local feature amount is calculated using Scale-Invariant Feature Transform (SIFT) disclosed in Non-Patent Document 5, Each local feature amount is represented as a 128-dimensional vector.

[Non-Patent Document 5]: David Q. Lowe, Distinctive image features from scale invariant key points. International Journal of Computer Vision, Vol. 60, No. 2, pp. 91-110, 2004.

The local feature amount calculation unit 36 receives the set of feature points output by the feature point extraction unit 32 and outputs a set of local feature amounts, similar to the local feature amount calculation unit 34.

The vector quantization unit 38 quantizes each local feature amount included in the set of local feature amounts output by the local feature amount calculation unit 34 into visual words on the basis of the previously created visual word dictionary. The visual word dictionary is an arrangement (set) of stored IDs (visual words) of the clusters obtained by clustering the local feature amounts calculated from a large number of images, and average vectors. In this embodiment, as a method of creating a visual word dictionary, about 5000 images are prepared in advance, and local feature amounts calculated from the images are clustered using an approximate k averaging method (see Non-Patent Document 6).

[Non-Patent Document 6]: James Fhilbin, Ondrej Chum, Michael Isard, Josef Sivie, and Andrew Zisserman. Object retrieval with large vocabularies and fast spatial matching. In CVPR, 2007.

Specifically, the vector quantization unit 38 receives the set of local feature amounts output by the local feature amount calculation unit 34 and the visual word dictionary, compares the local feature amount calculated from the first image in the pair of input images with the average vector of the clusters in the visual word dictionary, designates the ID of the cluster with the shortest Euclidean distance between the vectors as the visual word at a corresponding feature point, and outputs a set of visual words.

In this embodiment, the approximate nearest neighbor search method Randomized KD-tree disclosed in Non-Patent Document 7 is used as a method of searching for the ID of the cluster having the shortest Euclidean distance.

[Non-Patent Document 7]: Marius Muja and David G. Lowe. Fast Approximate nearest neighbors with automatic algorithm configuration. In VISAPP, pp. 331-340, 2009.

Each visual word is represented as an integer. Specifically, the designated visual word is represented by $u(p)$ at each feature point $p \in P$.

The vector quantization unit 40 receives the set of local feature amounts output by the local feature amount calculation unit 36 and the visual word dictionary, and outputs a set of visual words, similar to the vector quantization unit 38.

The visual word search unit 42 receives the set of visual words obtained from the two input images, searches for a pair of feature points (tentative matching points) for which the same visual word has been designated from the set of visual words obtained from the two input images, and outputs the set of tentative matching points, in this embodiment, large image database searching is assumed, an inverted index is created, and a search method based thereon is used. Each tentative matching point is represented as one visual word, and a scale, a characteristic angle and two-dimensional position coordinates of two feature points constituting the tentative matching point. Specifically, the sets of feature points extracted from the two input images are represented by P and Q, a set of tentative matching points is represented by C, and each tentative matching point $c \in C$ is represented by c=(p; q), $C \subseteq P \times Q$ is obtained by expression (1). P×Q is a Cartesian product of P and Q.

[Math. 1]

$$C=\{(p,q)\in P\times Q:u(p)=u(q)\} \qquad (1)$$

Each tentative matching point $c \in C$ is represented as expression (2).

[Math. 2]

$$c=(u(c),\ t(p),\ \sigma(p),\ \theta(p),\ t(q),\ \sigma(q),\ \theta(q)) \qquad (2)$$

<K-Neighbor Search Unit>

The K-neighbor search unit 24 receives the set of tentative matching points, searches for a pair of tentative matching points that are neighbors using k neighbors of the feature points in the position coordinate space with respect to the tentative matching points, and outputs a set of pairs of tentative matching points that are neighbors, in this embodiment, the approximate nearest neighbor search method Randomized KD-tree disclosed in Non-Patent Document 7 is used. Specifically, the pair of tentative matching points is represented by (ca; cb), the tentative matching point is represented as ca=(pa; qa) and cb=(pb; qb), and a set of k neighbors of feature points is represented by $N_k(\cdot)$. A space constraint $h_N$ of "the consistency of the proximity relationship" is represented as expression (3). [·] is 1 when the condition between square brackets is true and 0 when a condition is false in an Iverson notation. "∧" represents a logical conjunction.

[Math. 3]

$$h_N(c_a,c_b)=[(p_a\in \mathcal{N}_k(p_b))\wedge(p_b\in \mathcal{N}_k(p_a))\wedge(q_a\in \mathcal{N}_k(q_b))\wedge^*q_b\in \mathcal{N}_k(q_a))] \qquad (3)$$

A $G_N \subseteq C^2$ of a set of pairs of tentative matching points that are neighbors is obtained by expression (4), $C^2=C\times C$ is a Cartesian product of C and C.

[Math. 4]

$$G_N=\{(c_a,\ c_b)\in C^2: h_N(c_a,\ c_b)=1\} \qquad (4)$$

<Spatial Verification Unit>

Figure 3:
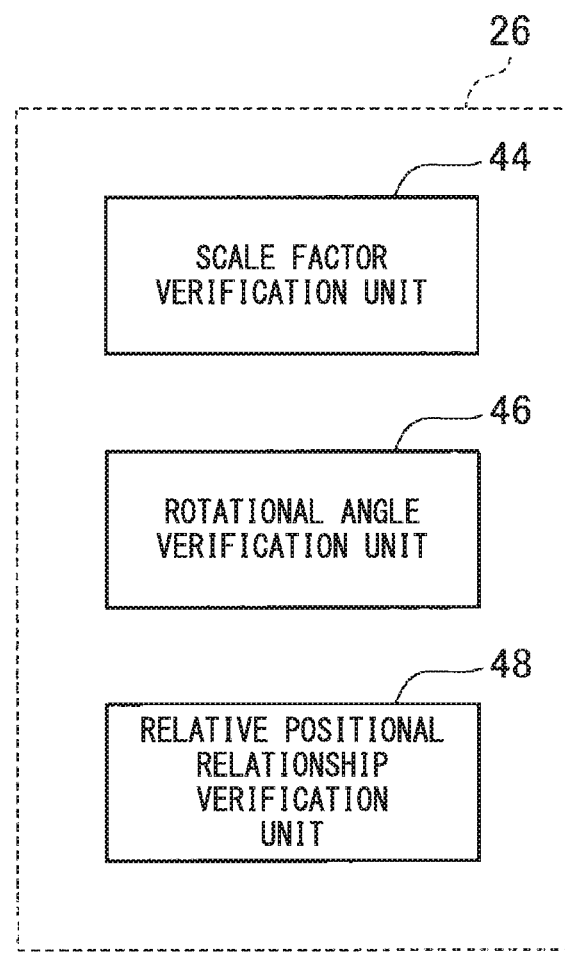
FIG. 3 is a block diagram showing a configuration of a spatial verification unit of the image collation device according to the embodiment of the present invention.

FIG. 3 is a block diagram showing an example of a configuration of the spatial verification unit 26. The spatial verification unit 26 Includes a scale factor verification unit 44, a rotational angle verification unit 46, and a relative positional relationship verification unit 48. The order of the verification units may be arbitrarily changed. The spatial verification unit 26 receives the set of pairs of tentative matching points that are neighbors output by the K-neighbor search unit 24 and outputs the number of pairs of correct matching points as the degree of similarity between the two input images.

The scale factor verification unit 44 verifies whether the pair of tentative matching points satisfies the condition of the spatial constraint in "the consistency of the scale factor" on the basis of a comparison between the geometric transformation parameters of the tentative matching points. In this embodiment, it is verified whether in the pair of tentative matching points, the magnitude relationships of the scales between the feature points in each of the input images are the same and it is verified whether the magnitude relationships of the scales of the feature points between the input images are the same. Specifically, the limiting condition $h'_\sigma$ according to the magnitude relationships of the scales between the feature points in each of the input images is represented by expression (5), and the limiting condition $h''_\sigma$ according to the magnitude relationships of the scales of the feature points between the input images is represented by expression (6).

[Math. 5]

$$h'_\sigma(c_a, c_b) = [(\sigma(p_a) > \sigma(p_b)) = (\sigma(q_a) > \sigma(q_b))] \quad (5)$$

$$h''_\sigma(c_a, c_b) = [(\sigma(p_a) > \sigma(q_a)) = (\sigma(p_b) > \sigma(q_b))] \quad (6)$$

A space constraint $h_{94}$ of "the consistency of the scale factor" is represented as expression (7). In the pair (ca; cb) of the tentative matching points, true is determined when $h_\sigma(ca; cb)=1$ and false is determined when $h_\sigma(ca; cb)=0$. "V" represents a logical disjunction.

[Math. 6]

$$h_{94}(c_a, c_b) = h'_{94}(c_a, c_b) \vee h''_\sigma(c_a, c_b). \quad (7)$$

The rotational angle verification unit 46 verifies whether the pair of tentative matching points satisfies the condition of the spatial constraint in "the consistency of the rotational angle" on the basis of a difference between, the geometric transformation parameters of the tentative matching points. In this embodiment, the rotational angle verification unit 46 verifies whether an absolute value of the difference between the rotational angles calculated from two tentative matching points among the pairs of tentative matching points is smaller than a previously set threshold value $\varepsilon_\theta$. Specifically, the rotational angle of the tentative matching point is calculated using $\theta(c)=\theta(p)-\theta(q)$. A space constraint $h_\theta$ of "the consistency of the rotational angle" is represented as expression (8). In the pair (ca; cb) of the tentative matching points, true is determined when $h_\theta(ca; cb)=1$ and false is determined when $h_\theta(ca; cb)=0$.

[Equation 7]

$$h_\theta(c_a, c_b) = [|\theta(c_a) - \theta(c_b)| < \varepsilon_\theta] \quad (8)$$

The relative positional relationship verification unit 48 verifies whether the pair of tentative matching points satisfies the condition of the spatial constraint in "the consistency of the relative positional relationship" on the basis of a comparison of or a difference between the geometric transformation parameters of the tentative matching points. In this embodiment, in the pair of tentative matching points, a combination of a total of two types of limiting conditions including the first limiting condition and a second limiting condition to be described below is used as the space constraint in "the consistency of a relative positional relationship". In the validation of the first limiting condition, relative position vectors between feature points in the two input images are calculated, and it is verified whether a maximum value of a length of a difference vector between the relative position vectors is smaller than a previously set threshold value $\varepsilon_v$. Specifically, in two feature points $p_a$ and $p_b$ in the input image, a relative position vector directed from $p_a$ to $p_b$ is calculated using expression (9).

[Equation 8]

$$v(p_b|p_a) = M(p_a)^{-1}(t(p_b) - t(p_a)) \quad (9)$$

M(p) is a matrix representing geometric characteristics of the feature point p, and is calculated by expression (10).

[Equation 9]

$$M(p) = \sigma(p) \begin{bmatrix} \cos(\theta(p)) & -\sin(\theta(p)) \\ \sin(\theta(p)) & \cos(\theta(p)) \end{bmatrix} \quad (10)$$

The first limiting condition $h'_v$ is represented as expression (11), $\|\ \|_2$ represents a Euclidean norm.

[Math. 10]

$$h'_v(c_a, c_b) = [\max(\|v(p_b \mid p_a) - v(q_b \mid q_a)\|_2, \\ \|v(p_a \mid p_b) - v(q_a \mid q_b)\|_2) < \varepsilon_v] \quad (11)$$

In the validation of the second limiting condition, the relative position vectors are converted into polar coordinates (a radius vector and an angle of deviation), it is verified whether magnitude relations between each of the radius vectors and a previously set threshold value are equal, and it is verified whether an absolute value of a difference between the angles of deviation is smaller than a previously set threshold value $\varepsilon_\alpha$. Specifically, the radius vector of the relative position vector v is represented as $\rho$, and the angle of deviation is represented as $\alpha$. A second limiting condition $h''_v$ is represented as expression (12).

[Math. 11]

$$h''_v(c_b|c_a) = [((\rho(p_b|p_a) > 1) = (\rho(q_b|q_a) > 1)) \wedge (|\alpha(p_b|p_a) - \alpha(q_b|q_a)| < \varepsilon_\alpha)] \quad (12)$$

A space constraint $h_v$ of "the consistency of a relative positional relationship" is represented as expression (13). In a pair (ca; cb) of tentative matching points, true is determined when $h_v(ea; cb)=1$ and false is determined when $h_v(ca; cb)=0$.

[Math. 12]

$$h_v(c_a, c_b) = h'_v(c_a, c_b) \wedge (h''_v(c_b|c_a) \vee h''_v(c_a|c_b)) \quad (13)$$

As described above, the spatial verification unit 26 receives the set of pairs of tentative matching points that are neighbors, which have been output by the K-neighbor search unit 24, and outputs the number of pairs of correct matching points as a degree of similarity between the two input images. In this embodiment, the set of spatial constraints that are used to identify the pair of correct matching points is represented by $H=\{h_\sigma, h_\theta, h_v\}$. A set $\hat{G}$ of pairs of correct matching points is obtained using expression (14).

[Math. 13]

$$\hat{G} = \left\{(c_a, c_b) \in G_N \ \Big| \ \left(\prod_{h \in H} h(c_a, c_b)\right) = 1\right\} \quad (14)$$

The number of pairs of correct matching points is obtained using the number |^G| of elements of ^G and output by the output unit 50.

<Operation of Image Collation Device According to Embodiment of the Present Invention>

Figure 4:
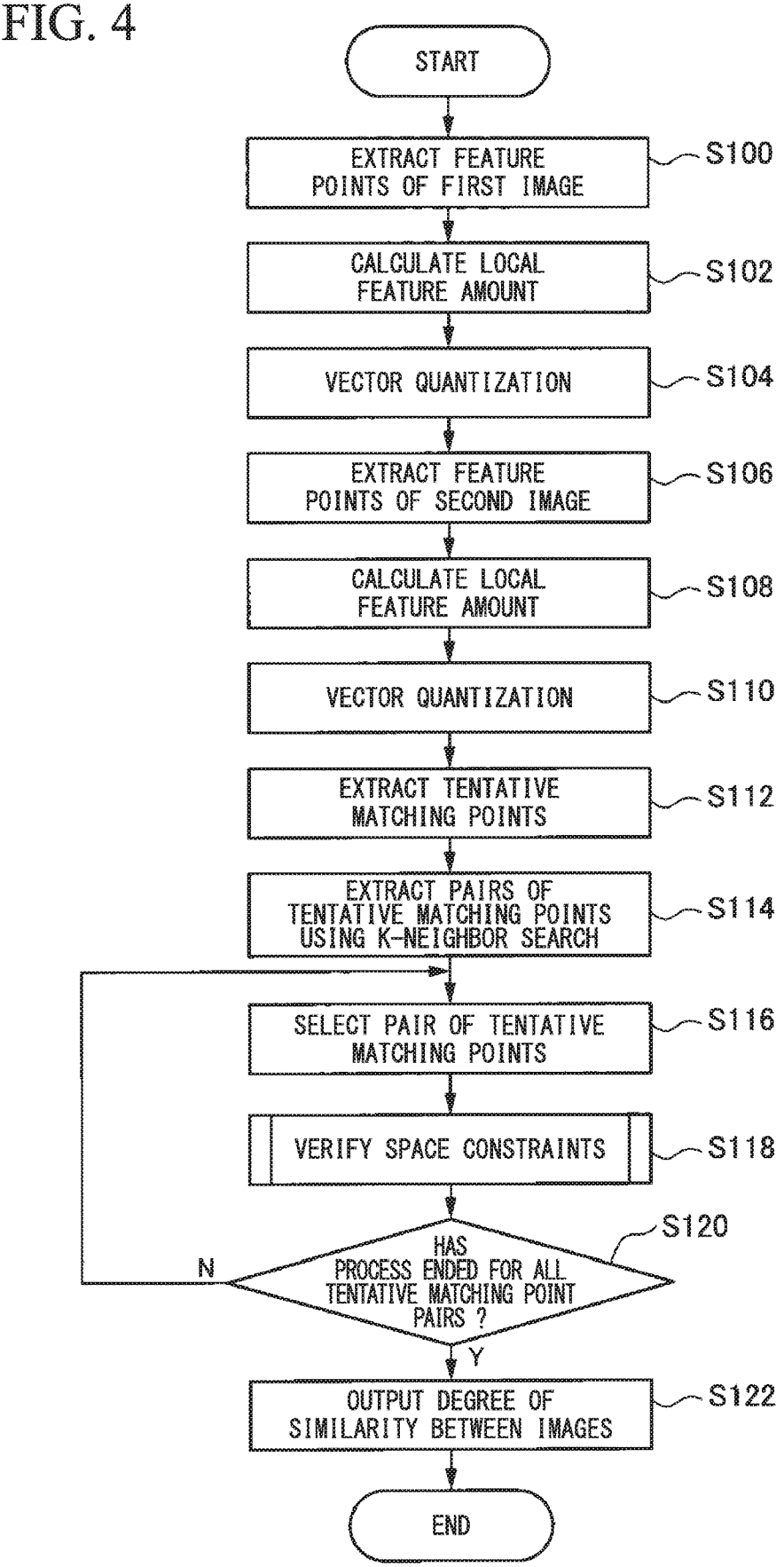
FIG. 4 is a flowchart showing an image collation processing routine in the image collation device according to the embodiment of the present invention.

Next, an operation of the image collation device 100 according to an embodiment of the present invention will be described. When the input unit 10 receives the pair of input images and the visual word dictionary, the image collation device 100 executes the image collation processing routine shown in FIG. 4.

First, in step S100, a set of feature points of the first image in the pair of input, images is extracted. In step S102, a local feature amount is extracted for each feature point included in the set of feature points of the first image extracted in step S100, and a set of local feature amounts is output.

In step S104, the set of local feature amount is quantized into the visual word with respect to the set of feature points in the first image on the basis of the visual word dictionary and the local feature amount of each feature point extracted in step S102.

In step S106, a set of feature points of the second image in the pair of input images is extracted. In step S108, a local feature amount for each of the feature points included in the set of feature points of the second image extracted in step S106 is extracted, and a set of local feature amounts is output.

In step S110, the set of local feature amounts is quantized into the visual word with respect to the set of feature points of the second image on the basis of the visual word dictionary and the local feature amount of each feature point extracted in step S108.

In the next step S112, a set of tentative matching points is extracted on the basis of the visual word for each feature point included in the set of feature points of the first image obtained in step S104 and the visual word for each feature point included in the set of feature points of the second image obtained in step S110.

In step S114, a set of pairs of tentative matching points that are neighbors is extracted according to expression (3) above from the set of tentative matching points extracted in step S112 on the basis of the set of k neighbors obtained for each feature point.

In step S116, a pair of tentative matching points is selected from the set of pairs of tentative matching points that are neighbors extracted in step S114.

In step S118, it is determined whether the pair of tentative matching points selected in step S116 satisfies all of the limiting condition regarding the consistency of the scale factor, the limiting condition regarding the consistency of the rotational angle, and the limiting condition regarding the consistency of the relative positional relationship to determine whether the pair of tentative matching points is a pair of correct matching point pairs or a pair of incorrect matching points.

In step S120, it is determined whether the process of step S118 has been executed for all the tentative matching point pairs included in the set of pairs of tentative matching points that are neighbors. When there is a tentative matching point pair for which the process of step S118 has not been executed, the process returns to step S116 and the tentative matching point pair is selected. On the other hand, when the process of step S118 has been executed for all the tentative matching point pairs included in the set of pairs of tentative matching points that are neighbors, the number of pairs of correct matching points Is output as the degree of similarity between pairs of input images by the output unit 50 in step S112, and the image collation processing routine ends.

Figure 5:
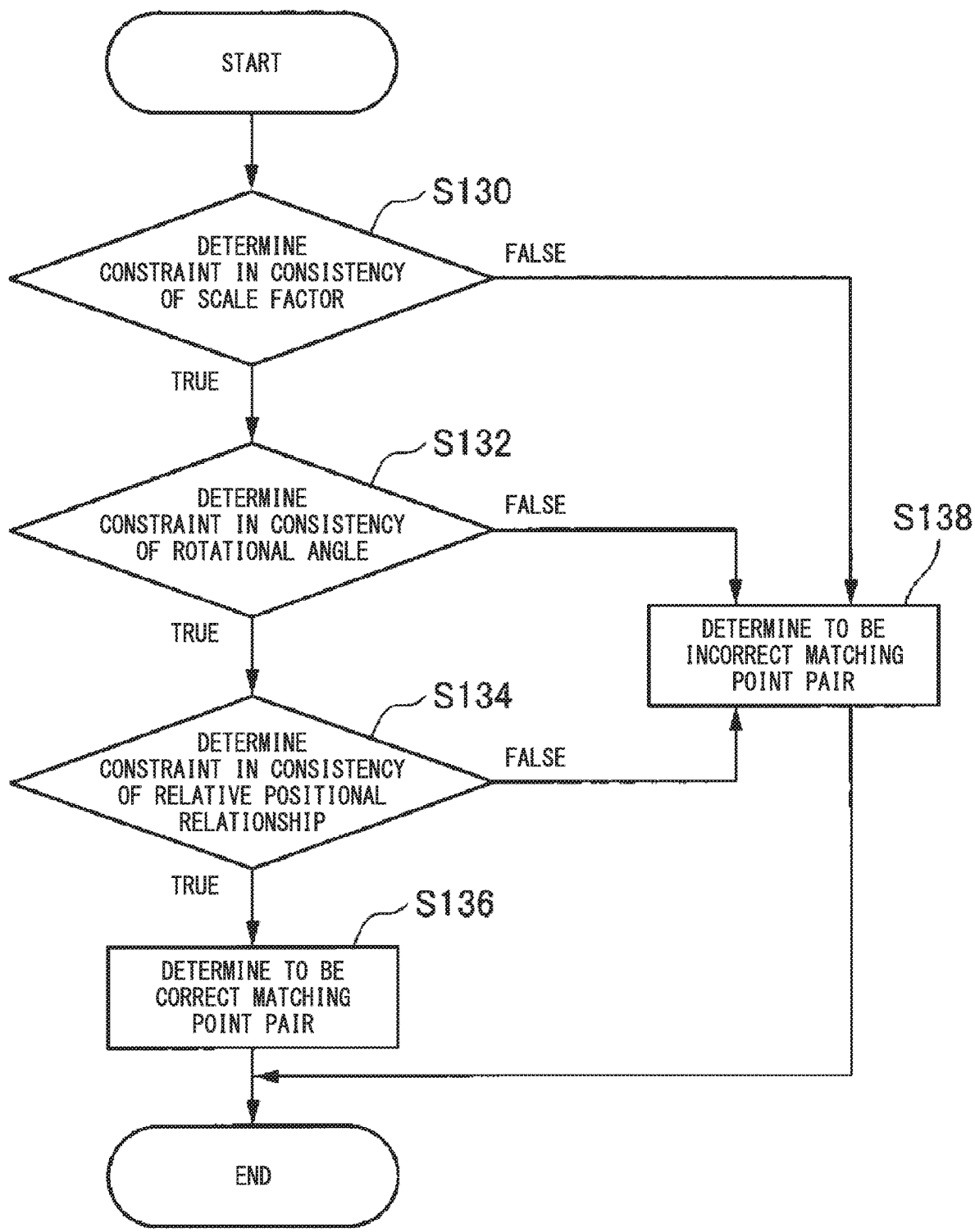
FIG. 5 is a flowchart showing a flow of a process of verifying a spatial constraint in the image collation device according to the embodiment of the present invention.

Step S118 is realized by a processing routine shown in FIG. 5.

In step S130, it is determined whether the pair of tentative matching points selected in step S116 satisfies the limiting condition regarding the consistency of the scale factor according to expression (7) above. When, the limiting condition regarding the consistency of the scale factor is satisfied, the process proceeds to step S132. On the other hand, when the limiting condition regarding the consistency of the scale factor is not satisfied, the process proceeds to step S138 and the pair of tentative matching points is determined to be a pair of incorrect matching points.

In step S132, it is determined whether the pair of tentative matching points selected in step S116 satisfies the limiting condition regarding the consistency of the rotational angle according to expression (8) above. When the limiting condition regarding the consistency of the rotational angle is satisfied, the process proceeds to step S134. On the other hand, when the limiting condition regarding the consistency of the rotational angle is not satisfied, the process proceeds to step S138 and the pair of tentative matching points is determined to be a pair of incorrect matching points.

In step S134, it is determined whether the pair of tentative matching points selected in step S116 satisfies the limiting condition regarding the consistency of the relative positional relationship according to expression (13) above. When the limiting condition regarding the consistency of the relative positional relationship is satisfied, the process proceeds to step S136 and the pair of tentative matching points is determined to be a pair of correct matching points. On the other hand, when the limiting condition regarding the consistency of the relative positional relationship is not satisfied, the process proceeds to step S138 and the pair of tentative matching points is determined to be a pair of incorrect matching points.

As described above, with, the image collation device according to the embodiment of the present invention, it is possible to accurately and rapidly collate the images even when the number of times of matching of feature points between the unrelated images is large and the geometric transformation between the related images is large.

Further, it is possible to increase discrimination ability between images by removing erroneously matched tentative matching points while avoiding, for example, search omission or excessive removal of the correct matching points by coupling the constraints of the spatial relationship to the constraints in a geometric transformation and increasing the number and type of space constraints that are used to identify the pairs of correct matching points.

Further, it is possible to limit memory usage required at the time of image collation to a smaller number by first identifying the tentative matching points on the basis of the "similarity between local feature amounts" and then verifying whether or not the condition of the spatial constraint is satisfied by targeting only the pairs of tentative matching points.

Further, it is possible to limit the number of times of verification of the condition of the space constraint to a smaller number (to make the search space smaller) by targeting only the pair of tentative matching points that are neighbors in the position coordinate space.

The present invention is not limited to the above-described embodiments, and various modifications or applications can be made without departing from the gist of the invention.

For example, in the above-described embodiments, the case in which the set of pairs of tentative matching points that are neighbors is extracted and it is determined whether or not all the limiting conditions are satisfied for each of the pairs of tentative matching points that are neighbors has been described, but the present invention is not limited thereto. It may be determined whether or not all the limiting conditions are satisfied for each of the pairs of all tentative matching points without extracting the set of pairs of tentative matching points that are neighbors.

INDUSTRIAL APPLICABILITY

The present invention can be applied to an application in which accurately and rapidly collating the images even when the number of times of matching of feature points between the unrelated images is large and the geometric transformation between the related images is large is indispensable.

REFERENCE SIGNS LIST

10 Input unit
20 Calculation unit
22 Tentative matching point extraction unit
24 Neighbor search unit
26 Spatial verification unit
30, 32 Feature point extraction unit
34, 36 Local feature amount calculation unit
38 Vector quantization unit
42 Visual word search unit
44 Scale factor verification unit
46 Rotational angle verification unit
48 Relative positional relationship verification unit
50 Output unit
100 Image collation device

The invention claimed is:

1. An image collation device comprising:
a tentative matching pair extraction unit configured to extract tentative matching pairs from a pair of input images, each of the tentative matching pairs including a pair of corresponding feature points between the pair of input images; and
a spatial verification unit configure to verify whether each set of the tentative matching pairs extracted by the tentative matching pair extraction unit satisfies each of a limiting condition regarding consistency of a scaling factor, a limiting condition regarding consistency of a rotational angle, and a limiting condition regarding consistency of a relative positional relationship according to a comparison of or a difference between geometric transformation parameters of the set of the tentative matching pairs, the spatial verification unit being configured to evaluate a degree of similarity between the pair of input images on the basis of sets of the tentative matching pairs that satisfy all of the limiting condition regarding consistency of the scaling factor, the limiting condition regarding consistency of the rotational angle and the limiting condition regarding consistency of the relative positional relationship.

2. The image collation device according to claim 1, further comprising:
a K-neighbor search unit configured to extract pairs of tentative matching pairs that are neighbors from all pairs of the tentative matching pairs on the basis of a set of feature points of k neighbors of each feature point in the pair of tentative matching pairs,
wherein the spatial verification unit evaluates the degree of similarity between the pair of input images on the basis of all of the limiting conditions for each pair of tentative matching pairs that are neighbors extracted by the K-neighbor search unit.

3. The image collation device according to claim 1,
wherein the limiting condition regarding the consistency of the scaling factor is, regarding the feature points at first and second tentative matching pairs forming a pair of the tentative matching pairs and first and second input images forming the pair of input images, that
a scale of the feature point of any one of the first and second tentative matching pairs is larger than a scale of the feature point the other of the first and second tentative matching pairs in both of a relationship between magnitudes of scales of the feature points in the first input image and a relationship between magnitudes of scales of the feature points in the second input image, or
a scale of the feature point of any one of the first and second input images is larger than a scale of the feature point of the other of the first and second images in both of a relationship between magnitudes of scales of the feature points in the first tentative matching pair and a relationship between magnitudes of scales of the feature points in the second tentative matching pair.

4. The image collation device according to claim 1,
wherein the limiting condition regarding the consistency of the rotational angle is, regarding the feature points at first and second tentative matching pairs forming a pair of the tentative matching pairs and first and second input images forming the pair of input images, that
an absolute value of a difference between a first rotational angle and a second rotational angle is smaller than a first previously predetermined threshold value, the first rotational angle being a difference between a characteristic angle of the first tentative matching pair in the first input image and a characteristic angle of the first tentative matching pair in the second input image, the second rotational angle being a difference between a characteristic angle of the second tentative matching pair in the first input image and a characteristic angle of the second tentative matching pair in the second input image.

5. The image collation device according to claim 1,
wherein the limiting condition regarding the consistency of the relative positional relationship is, regarding the feature points at respective first and second tentative matching pairs forming a pair of the tentative matching pairs and first and second input images forming the pair of input images, that
a maximum value of a length of a difference vector is smaller than a previously predetermined second threshold value, the difference vector being a difference between a first relative position vector and a second relative position vector, the first relative position vector indicating a difference in position between a characteristic point of the first tentative matching pair and a characteristic point of the second tentative matching pair in the first input image, the second relative position vector indicating a difference in position between the characteristic point of the first tentative matching pair and the characteristic point of the second tentative matching pair in the second input image, each of radius vectors obtained by converting the first and second relative position vectors into polar coordinates is greater than a previously predetermined third threshold value, and an absolute value of a difference between deflection angles obtained by converting the first and second relative position vectors into polar coordinates is smaller than a previously predetermined fourth threshold value.

6. The image collation device according to claim 1, wherein the spatial verification unit evaluates that the degree of similarity between the pair of input images is higher as the number of sets of the tentative matching pairs satisfying all of the limiting condition regarding the consistency of the scaling factor, the limiting condition regarding the consistency of the rotational angle, and the limiting condition regarding the consistency of the relative positional relationship increases.

7. An image collation method in an image collation device including a tentative matching pair extraction unit and a spatial verification unit, the image collation method comprising:

extracting, by a computer processor of the image collation device, tentative matching pairs from a pair of input images, each of the tentative matching pairs including a pair of corresponding feature paints between the pair of input images; and verifying, by the computer processor, whether each set of the tentative matching pairs extracted by the tentative matching pair extraction unit satisfies each of a limiting condition regarding consistency of a scaling factor, a limiting condition regarding consistency of a rotational angle and a limiting condition regarding consistency of a relative positional relationship according to a comparison of or a difference between geometric transformation parameters of the set of the tentative matching pairs evaluating, by the computer processor, a degree of similarity between the pair of input images on the basis of sets of the tentative matching pairs that satisfy all of the limiting condition regarding consistency of the scaling factor, the limiting condition regarding consistency of the rotational angle and the limiting condition regarding consistency of the relative positional relationship.

8. The image collation method according to claim 7, wherein the image collation device further includes a K-neighbor search unit, and the image collation method includes:

extracting, by the computer processor, the pairs of tentative matching pairs that are neighbors from all pairs of the tentative matching pairs on the basis of a set of feature points of k neighbors of each feature point in the pair of tentative matching pairs; and evaluating, by the computer processor, the degree of similarity between the pair of input images on the basis of all of the limiting conditions for each pair of tentative matching pairs that are neighbors extracted by the K-neighbor search unit.

9. The image collation method according to claim 7, wherein the limiting condition regarding the consistency of the scaling factor is, regarding the feature points at first and second tentative matching pairs forming a pair of the tentative matching pairs and first and second input images forming the pair of input images, that a scale of the feature point of any one of the first and second tentative matching pairs is larger than a scale of the feature point the other of the first and second tentative matching pairs in both of a relationship between magnitudes of scales of the feature points in the first input image and a relationship between magnitudes of scales of the feature points in the second input image, or a scale of the feature point of any one of the first and second input images is larger than a scale of the feature point of the other of the first and second images in both of a relationship between magnitudes of scales of the feature points in the first tentative matching pair and a relationship between magnitudes of scales of the feature points in the second tentative matching pair.

10. The image collation method according to claim 7, wherein the limiting condition regarding the consistency of the rotational angle is, regarding the feature points at first and second tentative matching pairs forming a pair of the tentative matching pairs and first and second input images forming the pair of input images, that an absolute value of a difference between a first rotational angle and a second rotational angle is smaller than a first previously predetermined threshold value, the first rotational angle being a difference between a characteristic angle of the first tentative matching pair in the first input image and a characteristic angle of the first tentative matching pair in the second input image, the second rotational angle being a difference between a characteristic angle of the second tentative matching pair in the first input image and a characteristic angle of the second tentative matching pair in the second input image.

11. The image collation method according to claim 7, wherein the limiting condition regarding the consistency of the relative positional relationship is, regarding the feature points at respective first and second tentative matching pairs forming a pair of the tentative matching pairs and first and second input images forming the pair of input images, that a maximum value of a length of a difference vector is smaller than a previously predetermined second threshold value, the difference vector being a difference between a first relative position vector and a second relative position vector, the first relative position vector indicating a difference in position between a characteristic point of the first tentative matching pair and a characteristic point of the second tentative matching pair in the first input image, the second relative position vector indicating a difference in position between the characteristic point of the first tentative matching pair and the characteristic point of the second tentative matching pair in the second input image, each of radius vectors obtained by converting the first and second relative position vectors into polar coordinates is greater than a previously predetermined third threshold value, and an absolute value of a difference between deflection angles obtained by converting the first and second relative position vectors into polar coordinates is smaller than a previously predetermined fourth threshold value.

12. The image collation method according to claim 7, wherein the computer processor evaluates that the degree of similarity between the pair of input images is higher as the number of sets of the tentative matching pairs satisfying all of the limiting condition regarding the consistency of the scaling factor, the limiting condition regarding the consistency of the rotational angle, and the limiting condition regarding the consistency of the relative positional relationship increases.

13. A non-transitory computer-readable recording medium having a program for causing a computer to function as each unit constituting the image collation device according to claim 1.

14. An image collation device comprising:

a tentative matching point extraction unit configured to extract a plurality of tentative matching points that are pairs of corresponding feature points between a pair of input images; and a spatial verification unit configured to evaluate a degree of similarity between the pair of input images on the basis of all of a limiting condition regarding consistency of a scale factor, a limiting condition regarding consistency of a rotational angle, and a limiting condition regarding consistency of a relative positional relationship according to a comparison of or a difference between geometric transformation parameters of the tentative matching points for each of the pairs of tentative matching points that is a combination of the tentative matching points extracted by the tentative matching point extraction unit, wherein the limiting condition regarding the consistency of the relative positional relationship is, regarding the feature points at respective first and second tentative matching points forming the pair of tentative matching points and first and second input images forming the pair of input images, that a maximum value of a length of a difference vector is smaller than a previously predetermined second threshold value, the difference vector being a difference between a first relative position vector and a second relative position vector, the first relative position vector indicating a difference in position between a characteristic point of the first tentative matching point and a characteristic point of the second tentative matching point in the first input image, the second relative position vector indicating a difference in position between the characteristic point of the first tentative matching point and the characteristic point of the second tentative matching point in the second input image, each of radius vectors obtained by converting the first and second relative position vectors into polar coordinates is greater than a previously predetermined third threshold value, and an absolute value of a difference between deflection angles obtained by converting the first and second relative position vectors into polar coordinates is smaller than a previously predetermined fourth threshold value.

15. An image collation method in an image collation device including a tentative matching point extraction unit and a spatial verification unit, the image collation method comprising:

extracting, by the tentative matching point extraction unit, a plurality of tentative matching points that are pairs of corresponding feature points between a pair of input images; and evaluating, by the spatial verification unit, a degree of similarity between the pair of input images on the basis of all of a limiting condition regarding consistency of a scale factor, a limiting condition regarding consistency of a rotational angle, and a limiting condition regarding consistency of a relative positional relationship according to a comparison of or a difference between geometric transformation parameters of the tentative matching points for each of the pairs of tentative matching points that is a combination of the tentative matching points extracted by the tentative matching point extraction unit, wherein the limiting condition regarding the consistency of the relative positional relationship is, regarding the feature points at respective first and second tentative matching points forming the pair of tentative matching points and first and second input images forming the pair of input images, that a maximum value of a length of a difference vector is smaller than a previously predetermined second threshold value, the difference vector being a difference between a first relative position vector and a second relative position vector, the first relative position vector indicating a difference in position between a characteristic point of the first tentative matching point and a characteristic point of the second tentative matching point in the first input image, the second relative position vector indicating a difference in position between the characteristic point of the first tentative matching point and the characteristic point of the second tentative matching point in the second input image, each of radius vectors obtained by converting the first and second relative position vectors into polar coordinates is greater than a previously predetermined third threshold value, and an absolute value of a difference between deflection angles obtained by converting the first and second relative position vectors into polar coordinates is smaller than a previously predetermined fourth threshold value.

* * * * *